United States Patent
Ellard

[11] Patent Number: 5,297,808
[45] Date of Patent: Mar. 29, 1994

[54] SIDECAR FOR BICYCLES

[76] Inventor: Terence R. Ellard, 6717 Palatine Ave. North, Seattle, Wash. 98103

[21] Appl. No.: 850,571

[22] Filed: Mar. 13, 1992

Related U.S. Application Data

[63] Continuation-in-part of Ser. No. 732,463, Jul. 18, 1991.

[51] Int. Cl.⁵ .............................................. B62B 1/04
[52] U.S. Cl. ....................................... 280/30; 280/62; 280/203
[58] Field of Search ............................ 280/203, 30, 62

[56] References Cited

FOREIGN PATENT DOCUMENTS 702323 1/1954 United Kingdom .................. 280/30
702362 1/1954 United Kingdom .................. 280/30

Primary Examiner—Mitchell J. Hill
Attorney, Agent, or Firm—Jensen & Puntigam

[57] ABSTRACT

The sidecar/stroller (200) includes a first wheel support assembly (222) which is movable between two positions. When the wheel support assembly (222) is in its first position, the apparatus is usable as a sidecar for bicycles, with upper and lower connections extending between the bicycle and the sidecar/stroller (200). When the wheel support assembly (222) is in its second position, forward of its first position, a rear wheel assembly (278) is secured to the sidecar/stroller and the apparatus is then useful as a stroller.

12 Claims, 8 Drawing Sheets

5,297,808

SIDECAR FOR BICYCLES

This is a continuation-in-part of pending U.S. Pat. application Ser. No. 732,463, filed on Jul. 18, 1991, titled: Sidecar for Bicycles.

TECHNICAL FIELD

This invention relates generally to sidecar-type vehicles and more particularly concerns a sidecar which is particularly adapted for use with bicycles and which also can be used as a stroller.

BACKGROUND OF THE INVENTION

There has historically existed a desire as well as a need for sidecar-type vehicles for use with, for instance, motorcycles and bicycles. Such sidecar vehicles, which are used primarily to carry passengers, are known in a variety of configurations and in varying complexity. Sidecar vehicles particularly adapted for use with bicycles are of increasing interest, due to the emphasis on bicycle riding in general, particularly for fitness purposes, and the accompanying need to conveniently accommodate children who are not large enough or otherwise capable of riding their own bicycle.

While the traditional child bicycle seat, mounted over the rear tire of the bicycle, to some extent satisfies this need, such an arrangement does place the child out of view of the user of the bicycle and sometimes creates problems with the balance of the bicycle, particularly with larger children. The rear bicycle seat may also be more dangerous than a sidecar arrangement. However, sidecars for bicycles have not been heretofore particularly favored, since they are often cumbersome to operate with the bicycle, and do not accurately follow the movement of the bicycle, particularly as the bicycle leans in one direction or the other.

DISCLOSURE OF THE INVENTION

Accordingly, the present invention is a sidecar for a bicycle, which includes a sidecar assembly, including a portion thereof which is adapted to support a passenger, wherein the sidecar assembly includes a wheel positioned within the assembly such that the passenger is positioned substantially directly above the wheel; first connecting means extending between the sidecar assembly to the bicycle at points in the vicinity of the axles of the respective wheels; and second connecting means extending between the sidecar assembly and the bicycle at points located a distance above the first connecting means, wherein the first and second connecting means each have swivel connection between the sidecar assembly and the bicycle, such that the sidecar moves in approximately mirror fashion to movement of the bicycle.

In another embodiment, the invention is a sidecar/stroller for use with a bicycle, comprising: a sidecar/stroller assembly, including a portion thereof which is adapted to support a passenger, wherein the sidecar/stroller assembly includes a first wheel support member, including a first wheel, the first wheel support assembly mounted to move between two positions, wherein in a first position the first wheel is located so that the apparatus functions as a sidecar when attached to a bicycle, while in a second position the first wheel support assembly is moved such that the first wheel moves relatively forwardly, the sidecar/stroller assembly further including a rear wheel assembly and means for receiving said rear wheel assembly when the first wheel support assembly is in its second position, whereby the sidecar/stroller apparatus functions as a stroller; means capable of receiving a lower connecting means extending between the sidecar/stroller assembly and a bicycle in the vicinity of the axles of the first wheel and the wheels of the bicycle; and means capable of receiving an upper connecting means extending between the sidecar/stroller assembly and the bicycle a distance above the lower connecting means.

BEST MODE FOR CARRYING OUT THE INVENTION

Figure 1:
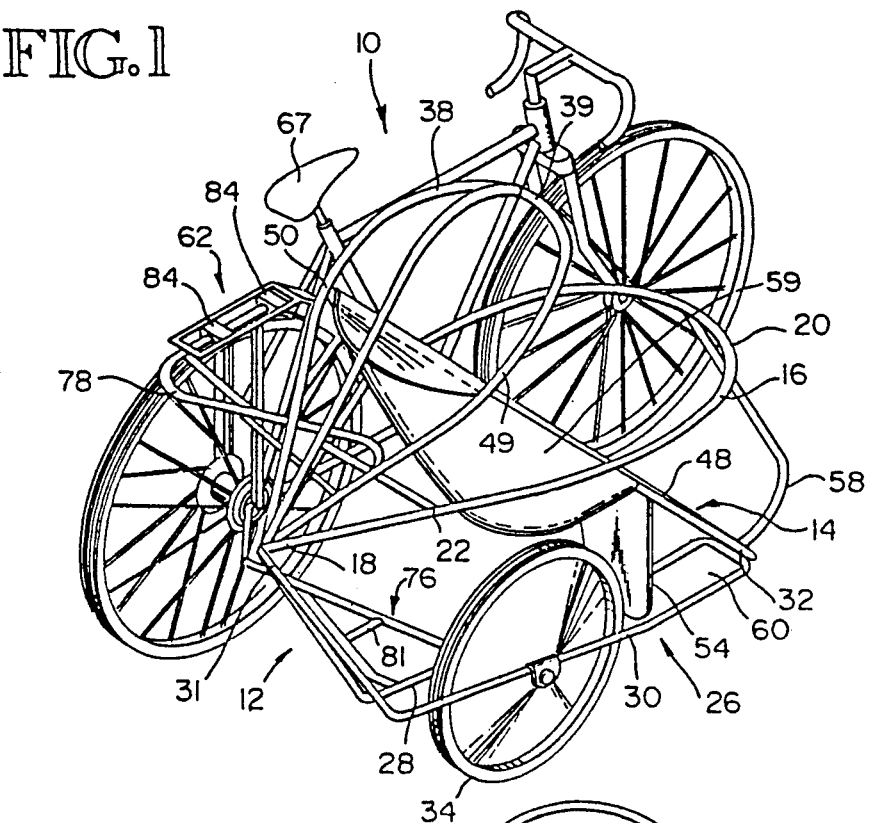
FIG. 1 is a isometric view of one embodiment of the combination of the sidecar of the present invention and a bicycle.
Figure 2:
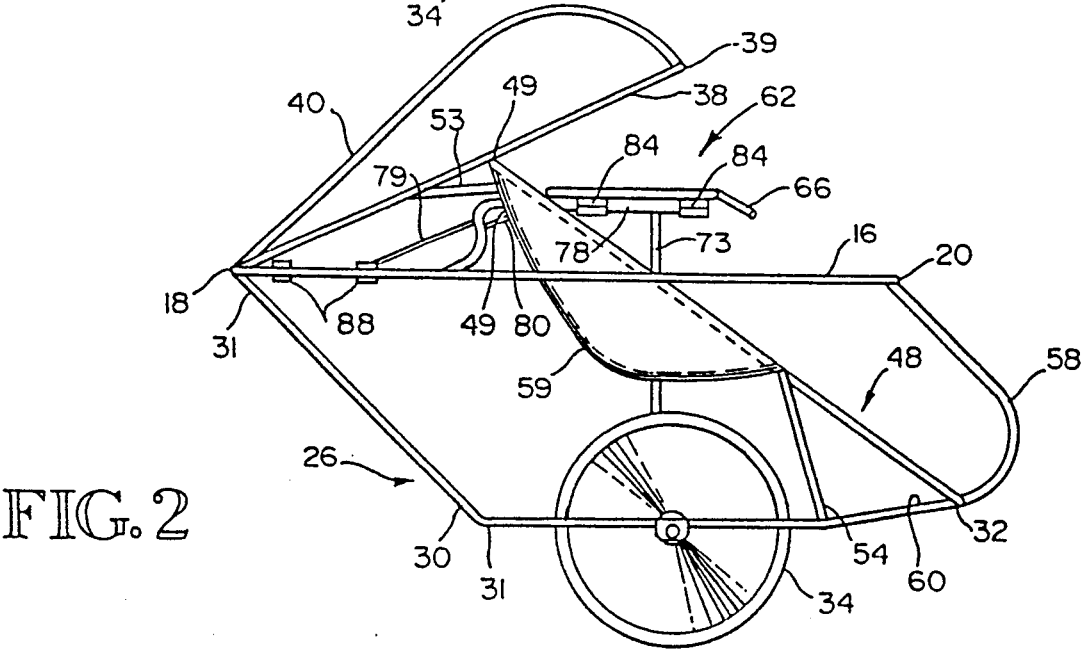
FIG. 2 is a side elevational view of the bicycle sidecar of FIG. 1.
Figure 4:
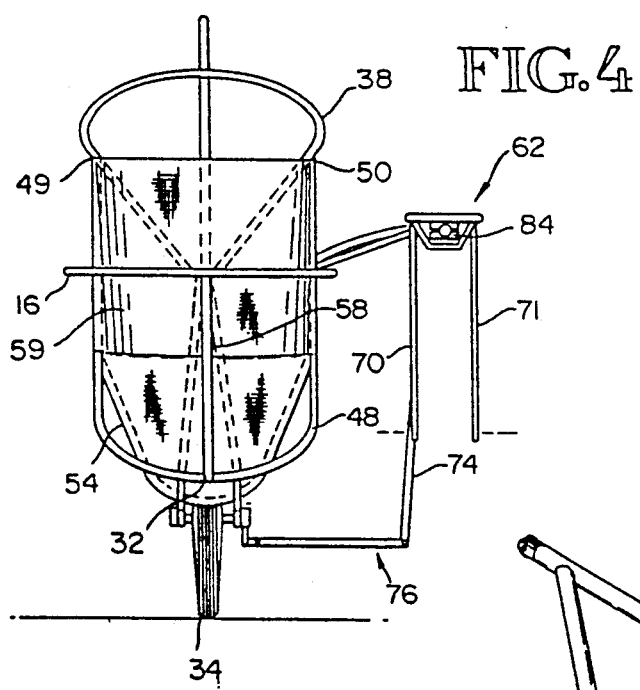
FIG. 4 is a front elevational view of the sidecar of FIGS. 1 and 2.

FIGS. 1, 2 and 4 show generally one embodiment of the bicycle sidecar of the present invention. FIG. 1 shows the sidecar relative to a conventional bicycle. The bicycle is shown generally at 10, and for purposes of illustration is a conventional adult-sized bicycle. The sidecar shown generally at 12 includes a frame assembly referred to generally at 14.

The frame assembly includes a first frame element 16 in the form of an elongated loop of one inch aluminum tubing, the loop being approximately 48 inches long from end to end. All other portions of the frame 14 are in the embodiment shown likewise made from one inch aluminum tubing. Alternatively, ¾ inch thin-walled steel could be used.

The rear end 18 of frame element 16 is blunt relative to the front end 20 thereof, which is curved. A lateral brace element 22 extends between opposite side of frame element 16, near the rear end 18 thereof. A longitudinal brace 24 extends from the rear end 18 of frame element 16 to the approximate center of lateral brace 22. All of the frame connections in this embodiment are accomplished by welding in the embodiment shown.

A second frame element 26 comprises two elongated sections of tubing 28 and 30. Sections 28, 30 are generally separated by 3¼ inches over their respective lengths but are joined to other frame elements at the rear and front ends 31 and 32, respectively. For instance, rear end 31 of second frame element 26 is joined to the rear end 18 of the first frame element 16. The second frame element 26 extends downwardly at an angle of approximately 60° from its point of connection with the rear end 18 of the first frame element for a length of approximately 22 inches, at which point it becomes basically horizontal, with a slight upward bend near the front end 32 thereof. Approximately midway of the horizontal portion of the second frame element, a wheel 34 is mounted for rotation. In the embodiment shown, the wheel 34 is approximately 16 inches in diameter.

A third frame element is positioned above the first frame element and includes a tubular element 38 basically in the form of an elongated loop which is positioned at an angle of approximately 30° to the first frame element 16. The rear end of the third frame element is blunt (it is joined to the rear end of first frame element 16) while the front end 39 is curved. A bracing element portion 40 of the third frame element extends from the rear end of the third frame element, which joins the rear ends of the first and second elements, curving slightly upwardly toward the front end thereof and then curving downwardly to join the remainder of the third frame element at the front end thereof. It should be noted in the particular embodiment shown that the rear ends of the respective first, second and third frame elements are approximately coincident, so that there is a substantially common joinder point. The third frame element basically provides a frame for an overhead cover for the passenger, while the second frame provides the basic support for the wheel.

A fourth frame element 48 is basically in the form of a loop with one end open. The two free ends 49, 50 of the loop are connected to tubular element 38 of the third frame element at approximately the mid-point between the front and rear ends thereof. The loop element 48 extends from those points downwardly at an angle of about 45° from the vertical, connecting at its lower end to the front end 32 of the second frame element. The first, second, third, and fourth frame elements provide a stable unit, due to their relative arrangement and points of connection, where they are welded together.

A horizontal member 53 extends from tubular element 38 to the fourth frame element 48, approximately 8 inches or so above the first frame element, on the side of the sidecar adjacent the bicycle. The purpose of member 53 will be clarified in following paragraphs.

A loop bracing member 54 (open at the top) extends from the opposite sides of fourth frame element 48 down to the second frame element at a point located at approximately one-third of the overall length of the second frame element from the front end 32 thereof. An additional bracing member 58 curves upwardly from the front end 32 of second frame element 26 to the front end 20 of the first frame element 16, providing a forward protection for the passenger, and also providing a shaping capability for a sidecar cover. The bracing members 54 and 58 also provide additional strength for the sidecar structure.

A section of flexible cloth or plastic material 59 is connected via snaps or the like to the opposite sides of the fourth frame element 48. The material is configured and shaped so as to provide a convenient seat for the user. A platform 60 for the feet of the passenger may be positioned between the two sides of the second frame element 26 forward of loop bracing member 54. In addition, a canopy cover element can be provided across the top of the third frame element and also around the front of the sidecar extending around the forward portions of the first and third frame elements and extending downwardly from the third frame element, thereby providing a capability of completely enclosing the passenger. The various sections of the cover can be connected with zippers or the like. The complete cover is shown at 61 in FIG. 10. A portion 63 of the compete cover 61 will be transparent, so the passenger can see out.

Figure 7:
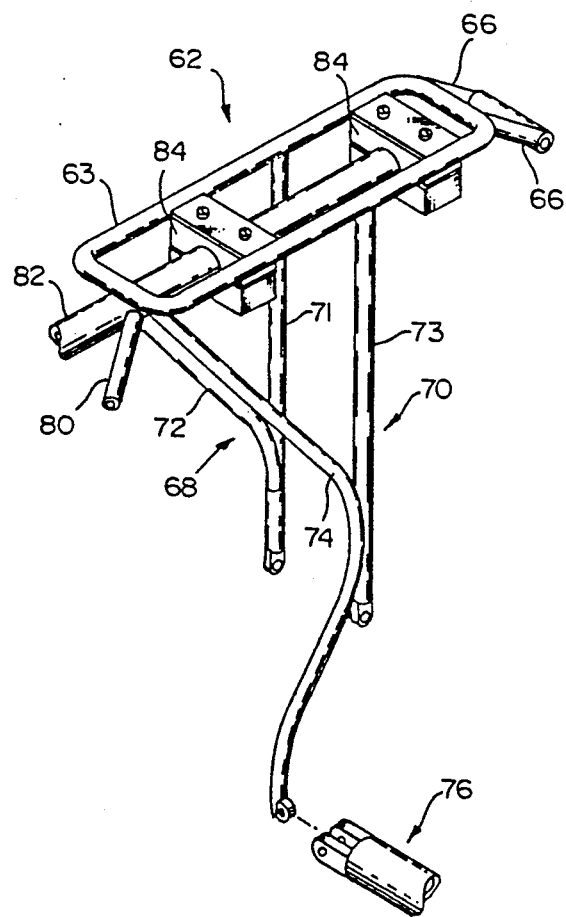
FIG. 7 is an isometric view of the bicycle mounting assembly.

Another major portion of the bicycle sidecar apparatus of the present invention in the embodiment shown is a mounting assembly shown generally at 62 which fits on the back of the bicycle. This is most clearly shown in FIGS. 1 and 7. The mounting assembly 62 includes a rack portion 63 which in the embodiment shown is in the form of a rectangle. Extending from the front end 64 of rack 63 are two prongs 66–66 which attach in conventional fashion to the frame of the bicycle underneath the bicycle seat 67. Two sets of forks 68–70 extend downwardly from the rack 63. The fork sets 68, 70 each include two elongated tubular elements. In fork set 68, one tubular element 71 extends from the midway point of the rack down to the axle of the rear wheel of the bicycle, where it is conventionally connected, while tubular element 72 extends downwardly and at an angle from the rear end of the rack, joining tubular element 71 a small distance above the axle.

Fork set 70 also comprises two tubular elements 73, 74. Tubular element 73 is similar to element 71 for fork set 68 and connects conventionally with the axle of the rear wheel of the bicycle. Tubular element 74 extends from the rear of the rack down to element 73, where it is welded to element 73 but then curves somewhat rearwardly and downwardly as shown, terminating approximately 5 inches below the axle of the bicycle wheel. This extended portion permits connection of the bicycle to the sidecar, as discussed in more detail below.

Figure 5:
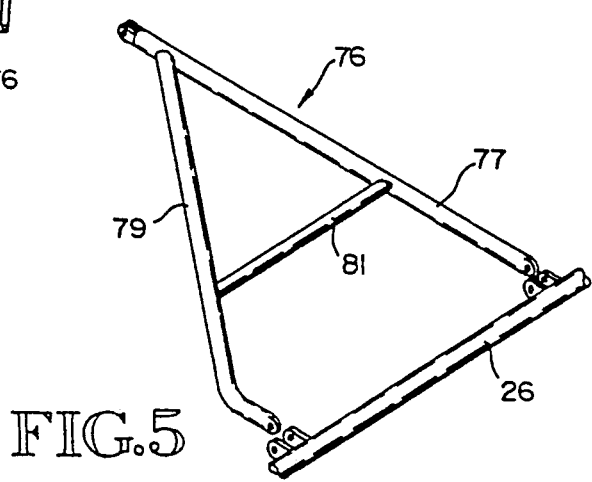
FIG. 5 is a isometric view of the first connecting assembly of the sidecar of FIG. 1.

A first connecting assembly shown generally at 76 extends between the second frame element 26 of the sidecar and the lower end of element 74 of fork set 70 on the bicycle. The connecting assembly is shown in detail in FIG. 5, but also in FIGS. 1 and 4. In the embodiment shown, the connecting assembly 76 includes an elongated tubular member 77 approximately 1 inch in diameter, which extends directly (straight across) between tubular member 74 and the second frame element 26. An angle element 79 extends from member 77 to frame element 26 at a point to the rear of the connection point between member 77 and frame element 26. An additional short bracing member 81 extends between members 77 and 79, giving a triangle effect for the connecting assembly 76.

The connection points between member 77 and 79 and tubular member 74 and second frame element 26, respectively, are swivel-type connections, providing a swiveling capability in the vertical plane of the bicycle and the sidecar, as the bicycle and the sidecar move in operation. In the embodiment shown, the connecting assembly 76 is arranged so that the axle of the sidecar wheel 34 is approximately in the same vertical plane as the axle of the rear wheel of the bicycle.

Figure 6:
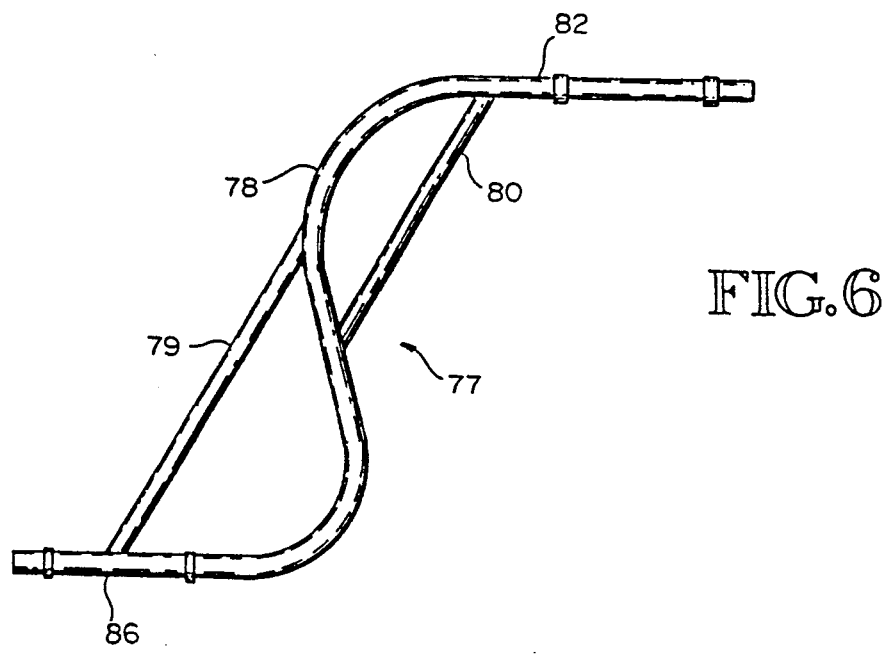
FIG. 6 is a top view of the second connecting assembly of the sidecar of FIG. 1.

A second connecting assembly 77, shown most clearly in FIG. 6, extends between first frame element 16 and the mounting assembly 62 on the bicycle, in particular the rack portion 63 thereof. Connecting assembly 77 comprises a generally S-shaped piece 78 and two parallel brace pieces 79 and 80 which provide lateral bracing for the S-shaped piece 78. The S-shaped piece 78 has two end portions which are substantially straight (and parallel) for a short distance. One end portion 82 of S-shaped piece 78 fits into nylon mounting elements 84—84 which are positioned on rack 63. Mounting elements 84—84 extend downwardly from brackets on rack 63 and are configured relative to the S-shaped piece 78 so as to firmly retain the S-shaped piece but permit rotation of the S-shaped piece in a vertical plane. The other end portion 86 of the S-shaped piece 78 fits into similar nylon mounting brackets 88—88 mounted directly on brace 24 of the first frame element 16. Mounting brackets 88—88 hold the S-shaped piece 78 firmly but permit rotation therein.

The first and second connecting assemblies 76 and 77, the tubular element 74 of fork set 70 and the connection points between connecting assemblies 76 and 77 and the sidecar form an approximate parallelogram in which each of the corner points of the parallelogram is swivelable in the plane of the parallelogram. In the embodiment shown, connecting assembly 77 is slightly longer than connecting assembly 76 (20 inches as opposed to 17 inches) so that the top leg of the parallelogram is slightly longer than the bottom leg. The vertical distance between the connecting assemblies 76 and 77 is approximately 20 inches. It would of course be possible to arrange the points of connection so that an exact parallelogram is achieved.

Figure 10:
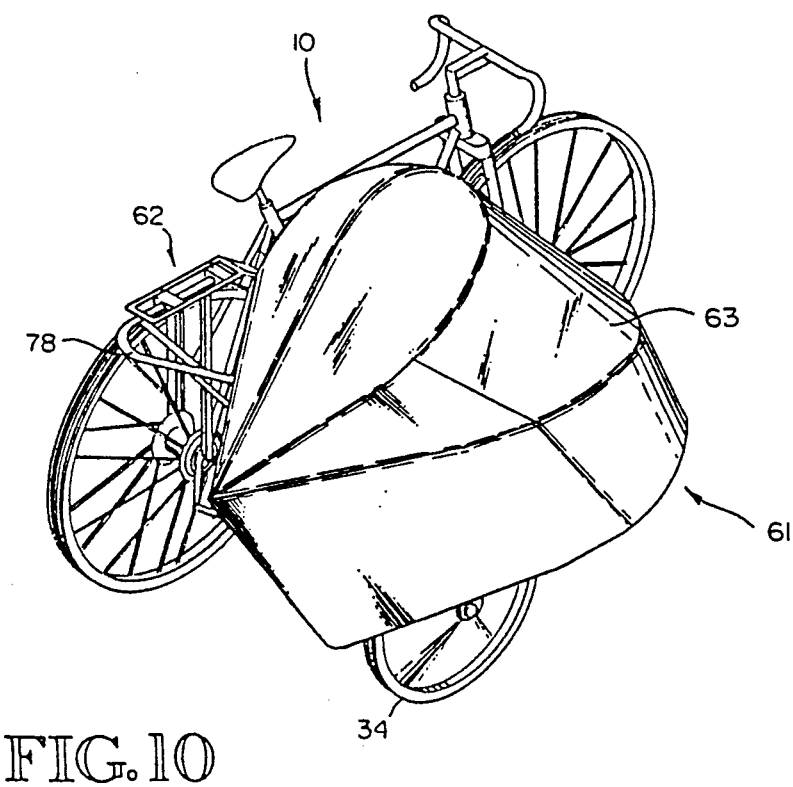
FIG. 10 is an isometric view of the present invention showing a cover element in place on the sidecar assembly.
Figure 11:
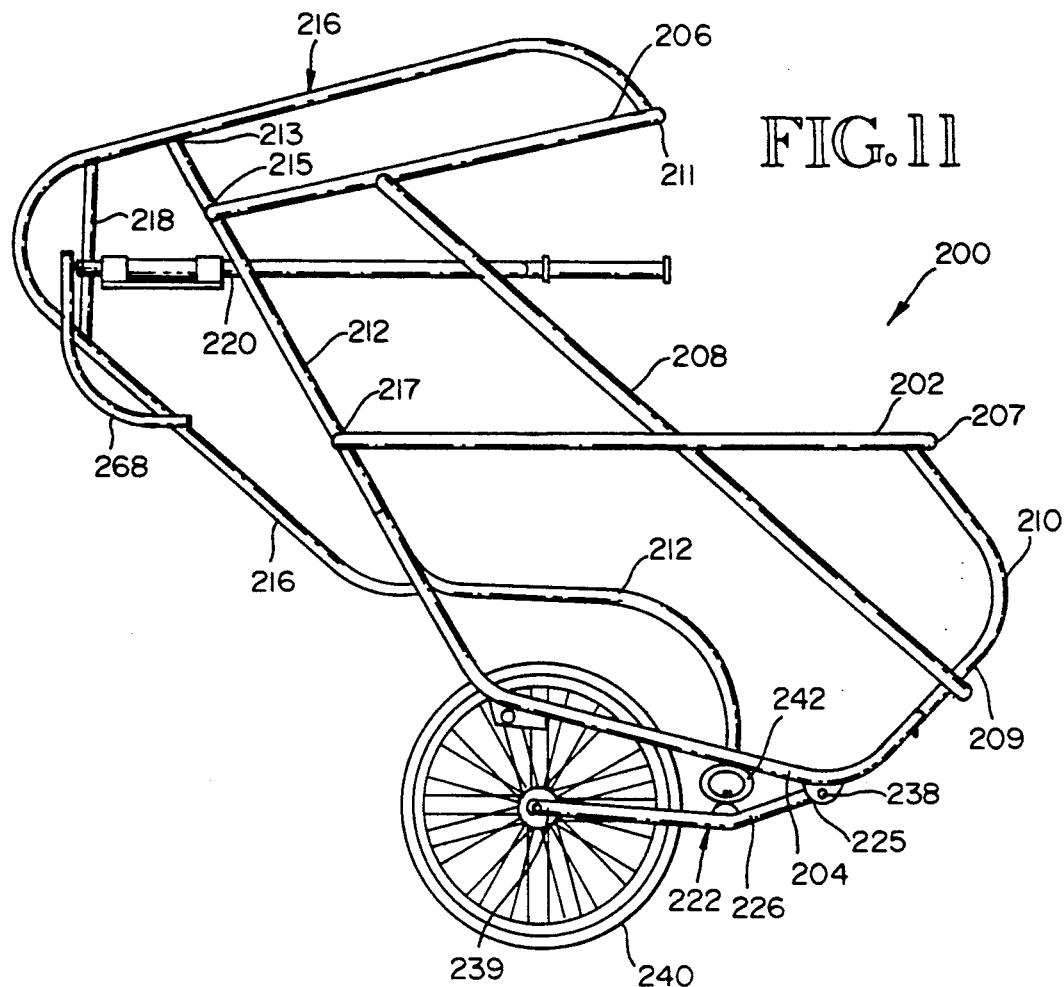
FIG. 11 is a side elevation view of another embodiment of the present invention, shown in a first arrangement.

It is this arrangement which provides a combination of structural strength and integrity for the sidecar relative to the bicycle, but also provides an arrangement by which the movement of the sidecar in essence mirrors or parallels the movement of the bicycle, an important consideration. In operation, a passenger is first situated in a seated position in the sidecar. As indicated above, the seat is cloth or other fabric which is configured and designed to accommodate a passenger while being secured to and by the fourth frame element 48 and the brace 54 extending down therefrom to the second frame element 26. Again, as indicated above, the passenger may be completely enclosed with zippered or snap-button coverings which extend around the first frame element forward of the passenger, with a transparent portion in front of the passenger, as shown in FIG. 10.

The bicycle is ridden in conventional fashion. The sidecar, due to its particular connective arrangement with the bicycle, including the position of the wheel on the sidecar relative to the rear wheel on the bicycle, follows the movement of the bicycle. Typically, the sidecar is configured so that the center-of-gravity of the passenger is directly over the sidecar wheel 34. This arrangement has been found to result in improved stability and performance. The sidecar frame assembly is further arranged so that there are limits to how far the sidecar can tilt in one direction or the other. In one direction, the S-shaped piece 78 will abut the first frame element 16, while in the other direction, the S-shaped piece will abut horizontal member 53.

Figure 3:
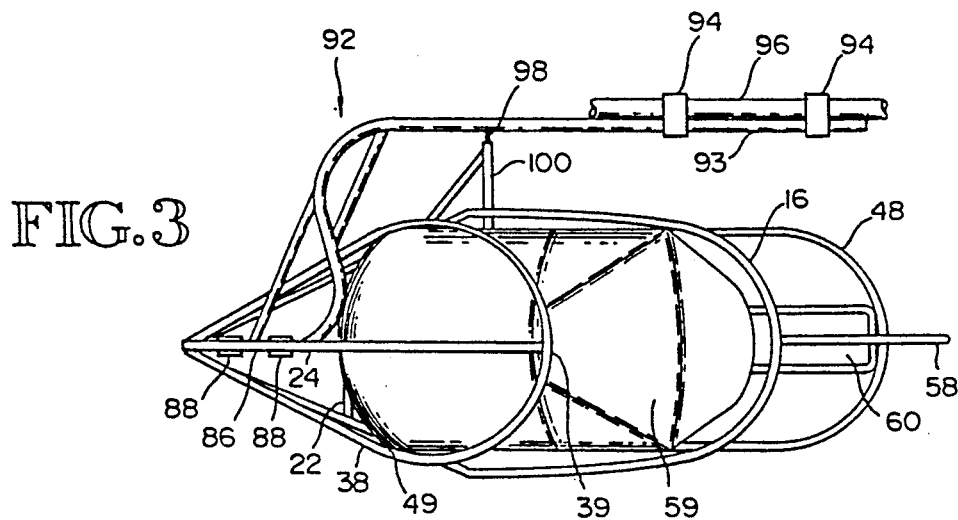
FIG. 3 is a top view of a second embodiment of the sidecar of the present invention.
Figure 9:
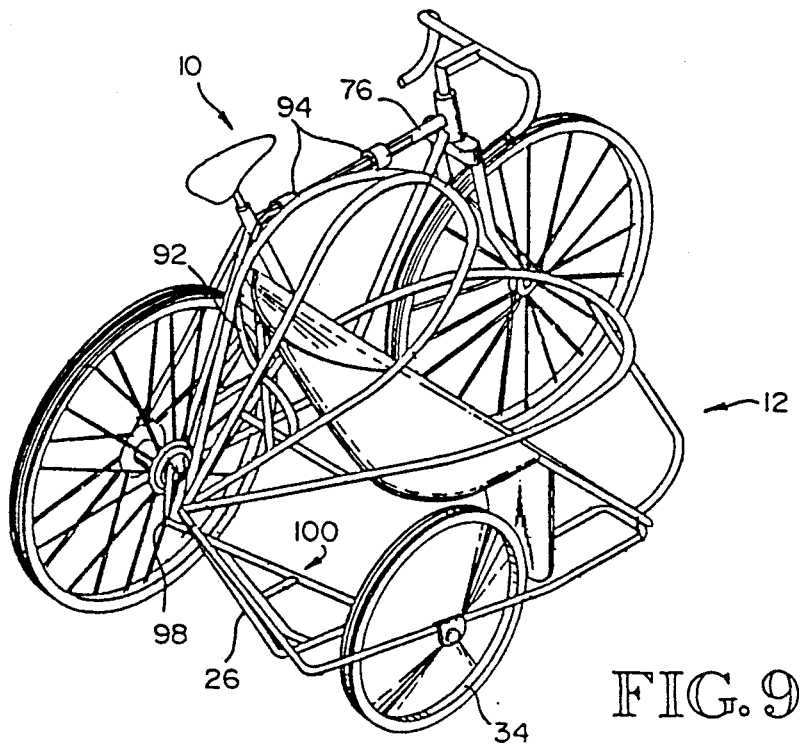
FIG. 9 is an isometric view of a second embodiment of the present invention.

A second embodiment for connecting the sidecar 12 to the bicycle 10 is shown in FIGS. 3 and 9. In the alternative embodiment, the second connecting assembly includes an S-shaped piece 92 which has one end portion 93 which extends for a substantial distance beyond the remainder of the S-shaped piece, arranged and configured so that it mates with mounting brackets 94—94 on the upper horizontal bar 96 of the bicycle. The swiveling arrangement of the S-shaped piece, relative to the mounting brackets 94, however, remains the same. The bicycle mounting assembly is not present in the second embodiment. There is, however, a bracket 98 which is connected to the axle of the rear wheel of the bicycle and extends downwardly therefrom a short distance. A first connecting assembly 100 extends between the bracket 98 and the second frame member 26 of the sidecar in swiveling fashion, as discussed above. The first connecting assembly is generally similar to connecting assembly 76 in the first embodiment.

Figure 8:
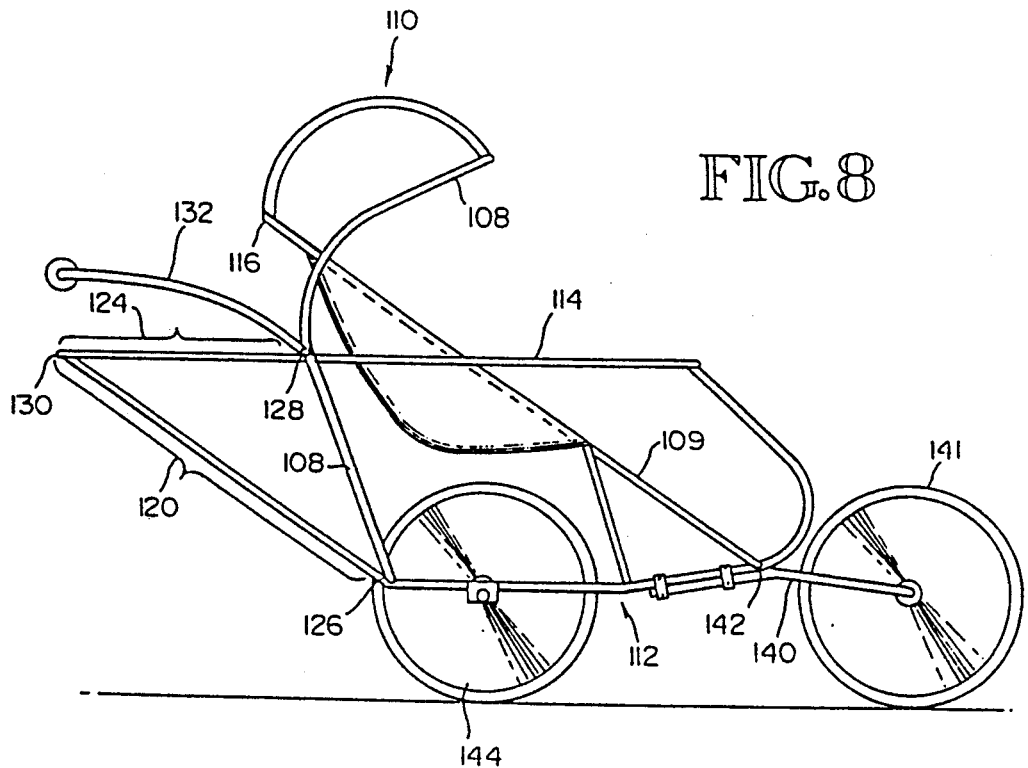
FIG. 8 is a side elevational view of an alternative embodiment for the sidecar of the present invention which is arranged to be convertible to a jogging apparatus.

FIG. 8 shows an outline of another embodiment of a bicycle sidecar which has the additional features of being collapsible and convertible to a jogging stroller. In this embodiment, the first frame element, second frame element and fourth frame elements, as well as the brace elements between the fourth and second frame elements and the first and second frame elements all remain similar to that of FIGS. 1, 2 and 4. In this embodiment, however, a fifth frame element 108 is positioned to the rear of the fourth frame element 109, extending upwardly from the second frame element 112, secured to the first frame element 114, and then extending further upwardly and forwardly, as shown. Frame element 108 is in the shape of a loop, open at the lower end thereof, where the respective free ends are attached to two portions of the second frame element 112. The third frame element 110 in the embodiment of FIG. 8 is a shortened version of the third frame element of the original embodiment, extending from the top end 116 of fourth frame element 109 forwardly and over the seated passenger.

In this embodiment, portion 120 of second frame element 112 and portion 124 of first frame element 114 are rotatable about points 126 and 128, respectively, or they could be removable at those points. Connection point 130 is held by a pin or the like. A handle 132 may be added to connection points 128 on either side of the sidecar, the handle being configured so as to curve to the rear.

An add-on fork 140 with a front wheel 141 is provided to extend from connection point 142 at the front end of the sidecar, connected by means of straps and screws or the like. Two rear wheels 144 are typically provided with a leaf spring to replace the one wheel of the above-described embodiment. When the sidecar of FIG. 8 is disconnected from the bicycle, the sidecar may be conveniently used as a jogging stroller. This embodiment provides flexibility and an alternative use for the sidecar of the present invention, as well as increased flexibility due to its capability of partially collapsing.

An additional connecting assembly could be used between the bicycle and the sidecar, if further stability is desired. The additional connecting assembly would be at the same approximate height as the second connecting assembly of FIG. 1 and could extend from the front of the sidecar to the bicycle downtube located just behind the front wheel, at a point several inches below the top of the downtube.

Also, it is contemplated that the sidecar could be a solid molded unit, from plastic or the like, including a complete solid cover. In such an embodiment, the frame assembly described above in terms of individual members would be in the form of molded ribs and the cover would be solid plastic. The entire sidecar would thus be a single integral unit, with a portion of the cover being removable for ingress and egress of the passenger. The connecting assemblies would remain the same, connecting to mounting brackets on the solid sidecar. The solid sidecar would have the exterior appearance of the unit shown in FIG. 10.

A further embodiment of the present invention is shown in FIGS. 11-15. This embodiment is specifically adapted to function as a three-wheeled running stroller in addition to functioning as a sidecar for bicycles. The sidecar/stroller apparatus is generally referred to at 200. Apparatus 200 includes a frame which is similar in many respects to that described for the embodiment of FIGS. 1-4. For instance, apparatus 200 includes a first frame element 202, which generally takes the form of a two-part elongated hoop generally comparable to element 16 in FIGS. 1-4; a second frame element 204, which is generally comparable to element 26; a third frame element 206, which is located above the first frame element and is also in the form of a two-part elongated hoop; and a fourth frame element 208, which is a two-part elongated loop extending downwardly from the third frame element 206, past the first frame element 202, at an angle of approximately 45°, similar to element 48 in FIGS. 1-4. Elements 202, 206 and 208 are made in two parts so they can be removed from the remainder of the apparatus.

A connecting member 210 extends between the front end 207 of the first frame element and the front end 209 of the second frame element. A rear bracing element 212 extends from a point a few inches above the rear end 215 of third frame element 206 downwardly past the rear end 217 of first frame element 202, to which it is connected, joining with a cross-end element 209 (FIG. 13) at the rear end of the second frame element 204 and then curving downwardly and then forwardly and then downwardly again, terminating at a cross-piece 214 which is part of second frame element 204. A bracing member 216 extends from front end 211 of third frame element 206, curving initially upwardly and then extending rearwardly so that it becomes approximately parallel with third frame element 206, connecting at upper end 213 of rear bracing element 212 and thereafter extending slightly to the rear thereof, at which point it curves downwardly and then downwardly and forwardly until it terminates at rear bracing member 212, slightly below cross-end element 209.

A vertical bracing piece 218 extends between two portions of bracing member 216 to the rear of rear bracing member 212, while a horizontal bracing member 220 extends between vertical bracing member 218 and rear bracing member 212.

Figure 12:
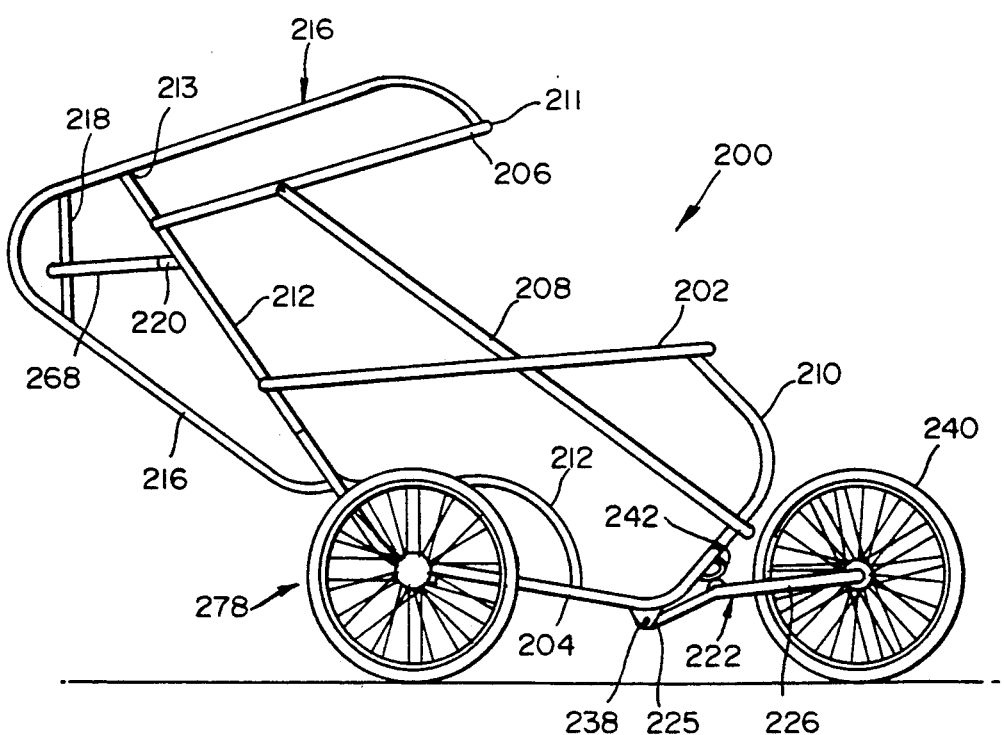
FIG. 12 is a side elevation view of the embodiment of FIG. 11 in a second arrangement.
Figure 13:
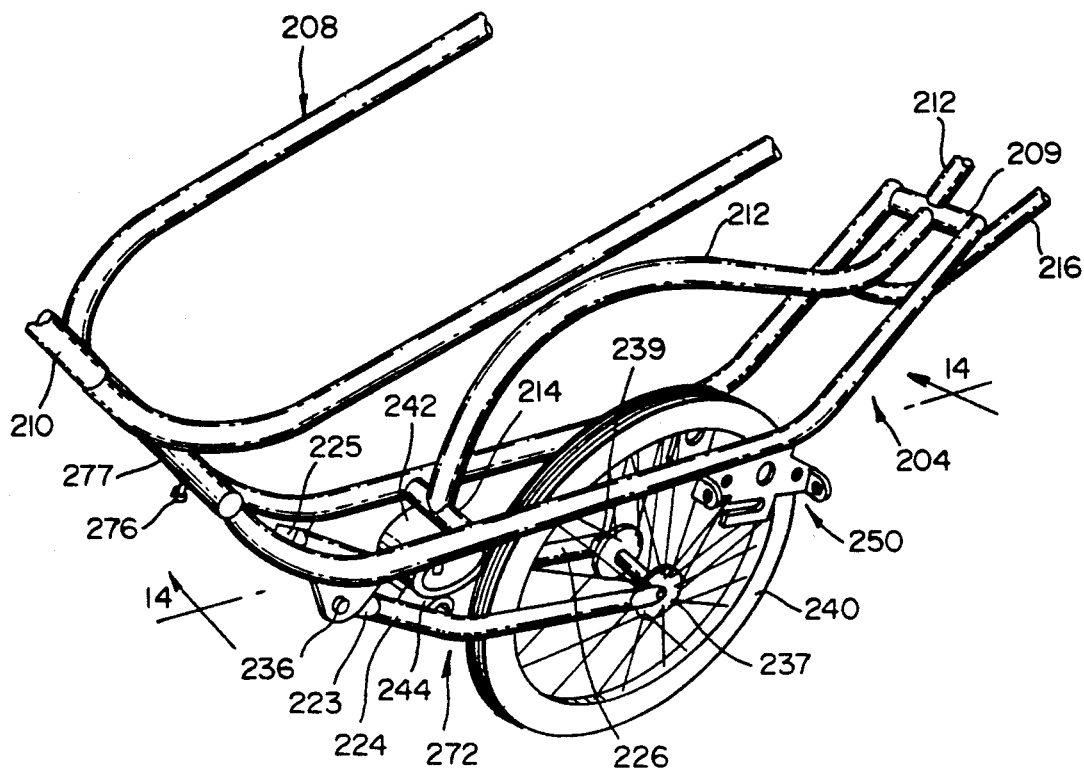
FIG. 13 is an isometric view of a portion of the embodiment of FIG. 11.

The embodiment of FIGS. 11-15 includes a wheel support assembly 222, which comprises two elongated members 224 and 226, joined by a cross-member 228 (FIG. 12). The forward ends 223, 225 of members 224 and 226, respectively, are pivotally connected to second frame element 204 at swivel connections 236 and 238. A wheel 240 is mounted between rear ends 237, 239 of members 224 and 226. When the apparatus of FIGS. 11-15 is used as a bicycle sidecar, support assembly 222, including wheel 240, is in a first position, in which wheel 240 is located to the rear of swivel connections 236 and 238, beneath a seated user, similar to that arrangement shown in the embodiment of FIGS. 1-4. A bumper element 242 is positioned between wheel support assembly 222 and second frame element 204, providing a shock-absorbing capability for the sidecar configuration.

Figure 14:
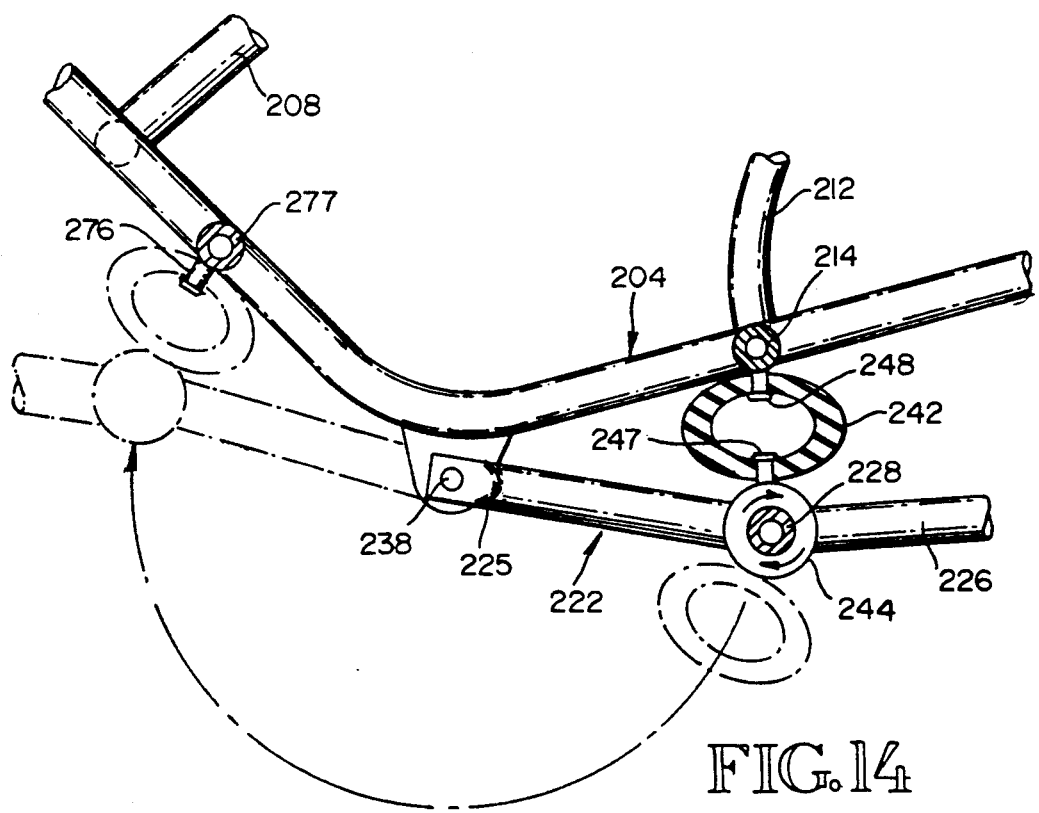
FIG. 14 is a cross-section view taken along lines 14—14 in FIG. 13.
Figure 15:
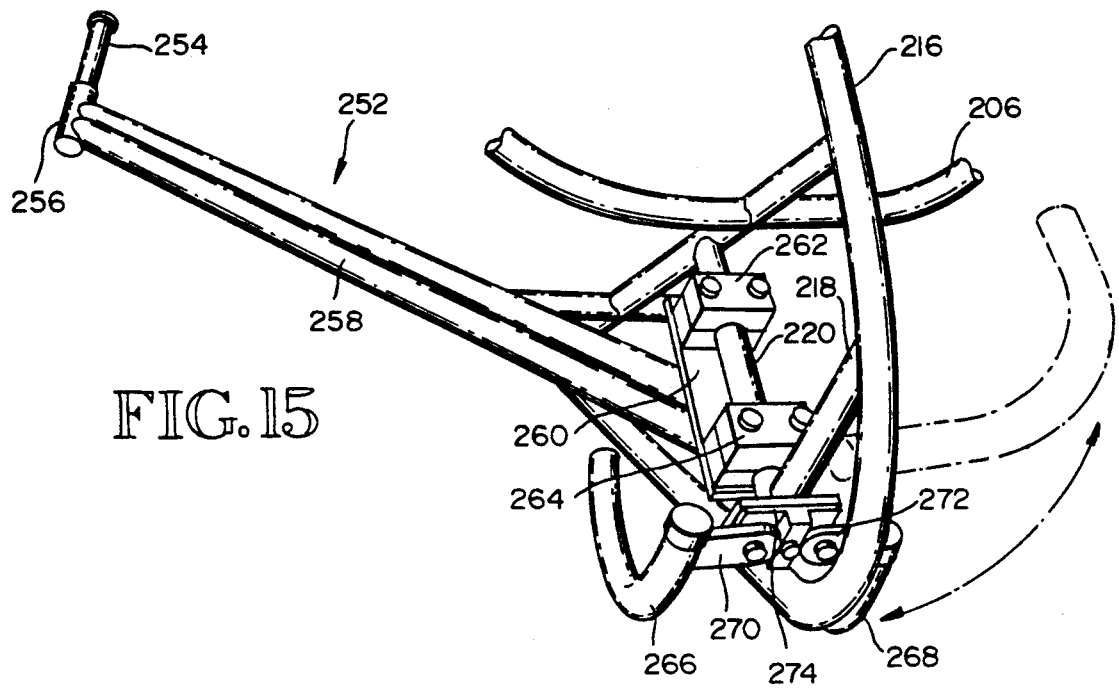
FIG. 15 is an isometric view of another portion of the embodiment of FIG. 11.

In the embodiment shown, bumper 242 is a hollow cylindrical section, somewhat elliptical in cross-section, having a wall which is approximately ⅛ inch thick. In the embodiment shown, bumper 242 is made from a fairly hard, resilient plastic material. Located on cross-member 228, which is circular in cross-section, is a circular bearing 244 which is mounted for rotation thereabout. Bearing 244 includes a threaded opening to receive a screw or the like. An opening is provided through bumper 242 and bumper 242 is attached to bearing 244 by means of a screw 247 or the like, mating with the threaded opening. This arrangement permits bumper 242 to be rotated about cross-member 228. Extending downwardly from cross-piece 214 is a pin 248. Pin 248 mates with another opening in bumper 242 opposite to the opening for the screw. Pin 248 snaps through this other opening in the bumper, as shown in FIG. 14 most clearly, so that the bumper is held in place between wheel support element assembly 222 and second frame element 204, but is removable from pin 248 without the aid of tools.

As with the other embodiment described above, the apparatus is secured to the bicycle at two points when it is in its sidecar arrangement or orientation. The lower connection is in the vicinity of the wheel 240. A brace, similar to that shown in FIG. 5, extends between the bicycle (not shown) and the sidecar/stroller apparatus 200. The two free ends of the brace connect to a fixed bracket 250 (FIG. 13) on the sidecar/stroller which extends downwardly from second frame element 204, slightly to the rear of the rear ends of elongated members 224 and 226 of the wheel support element 222.

The upper connection 252 (FIG. 15) of sidecar/stroller 200 to the bicycle has a different configuration than the connection shown in FIG. 6 for the embodiment of FIGS. 1-4. It includes a first portion 254 which is rotatably supported in a receiving assembly on the bicycle, similar to that shown in FIG. 7. Extending at an angle away from the rear end 256 of first portion 254 is an intermediate portion 258, which in the embodiment shown, comprises two side-by-side tubular elements for increased strength. Other arrangements could be used. At the sidecar, intermediate portion 258 is connected to a plate 260, which in turn is mounted by screws or the like to two plastic support elements 262 and 264, which are free to rotate about horizontal bracing element 220. This arrangement permits the necessary relative movement between the sidecar and the bicycle.

When the sidecar/stroller apparatus 200 is to be used as a stroller, the apparatus is disconnected from the bicycle by removing the connecting brace from bracket 250 on the sidecar and also removing upper connection 252 from the bicycle or the sidecar.

The apparatus 200 is then converted into its stroller configuration. Two handlebar elements 266 and 268 (FIG. 15) are rotated into their stroller orientation. Each handlebar element 266, 268 is a length of tubing which is arranged into a 90° curved section. One end of each of the handlebar elements 266 and 268 has ear portions 270, 272 extending therefrom, the respective ear portions being rotatably connected to a small mounting bracket 274 which is attached to the rear surface of vertical bracing piece 218 by means of a bolt or the like. When apparatus 200 is in its sidecar configuration, handlebar elements 266 and 268 are positioned so that they are vertically oriented, positioned relatively close to bracing member 216, while when the apparatus is in its stroller configuration, handlebar elements 266, 268 are rotated into a horizontal position extending directly outwardly from bracing member 216. In this position, the elements 266, 268 function as handlebars for the stroller.

When the apparatus 200 is arranged into its stroller configuration, the wheel assembly 222 with the wheel 240 is rotated (FIG. 12) about swivel connections 236 and 238 such that wheel 240 is located forwardly thereof, against second frame element 204. Bumper 242 is rotated (by rotation of bearing 244) on cross-piece 228 such that the opening in the bearing opposite the screw comes into contact with a pin 276 which extends downwardly from a cross-piece 277 at the front of the second frame element 204. Thus, bumper 242 acts as a shock absorber in this position of the wheel support assembly as well. A rear wheel assembly, comprising two wheels with extending stub axles, joined by a leaf spring arrangement, shown generally at 278, is then secured to the stroller assembly at bracket 250 and another bracket on the other longitudinal member of frame element 204. The apparatus is now suitable for use as a stroller, in particular a running stroller. The leaf spring arrangement provides additional shock absorbing capability, such that the stroller may be conveniently used in rough terrain, even over curbs and the like.

It should be recognized that FIGS. 11-15 for this embodiment show only the frame of the apparatus, and that the actual apparatus will include a seat arrangement of cloth or like material to support a child in the stroller.

The various frame elements in the embodiment shown are tubular metal members, some portions of which are configured to be removable, as indicated above, to permit convenient (flat) storage and transport of the apparatus. In particular, the first frame element 202, the third frame element 206 and fourth frame element 208 are removable. This is readily accomplished through the use of fitting-like joints between those elements and the remainder of the apparatus.

Figure 16:
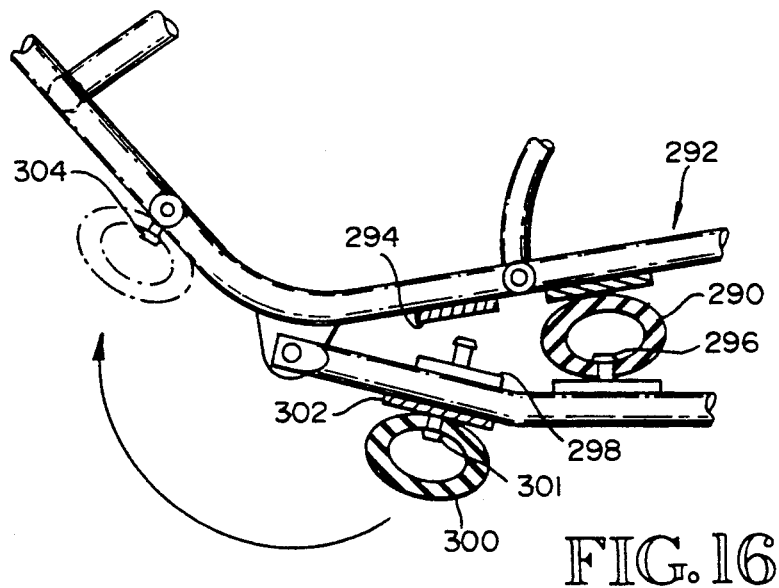
FIG. 16 is a cross-section view of a variation of the structure of FIG. 14.

A variation of the embodiment of FIGS. 11-15 is shown in FIG. 16. This variation concerns the bumper element located between the forward wheel assembly and the second frame element. In the embodiment of FIG. 16, a first bumper 290 extends downwardly from one longitudinal member of second frame element 292. Bumper 290 is mounted by a screw or the like onto a mounting plate 293. Another mounting plate 294 can be provided a slight distance forwardly along the second frame element so as to provide an alternate position for bumper 290. A similar arrangement is located on the other longitudinal member of second frame element 292, so that there are bumper elements on both sides of the wheel when the apparatus is in its sidecar configuration. Spaced pins 296 and 298 extend upwardly from the wheel support assembly and one pin is snapped through the mating opening in bumper 292, depending upon the position of the bumper. A similar arrangement is provided for the other bumper.

A third bumper 300 extends downwardly from the wheel support assembly, mounted to a plate 302 by means of a screw 301 or the like. When the wheel support assembly is rotated forwardly into its stroller configuration, bumper 300 rotates with the wheel support assembly until it comes into contact with the undersurface of the front end of the second frame element, mating with a pin 304.

With the embodiment of FIG. 16, there is no need to rotate the bumpers. However, this embodiment does require multiple bumpers.

Although preferred embodiments of the invention have been disclosed herein for purpose of illustration, it should be understood that various changes, modifications, and substitutions may be made without parting from the spirit of the invention, which is defined by the claims which follows:

What is claimed is:

1. A sidecar/stroller for use with a bicycle, comprising:
   a sidecar/stroller assembly, including a portion thereof which is adapted to support a passenger, wherein the sidecar/stroller assembly includes a first wheel support assembly, including a first wheel, the first wheel support assembly mounted to move between two positions, wherein in a first position the first wheel is located so that the apparatus functions as a sidecar when attached to a bicycle, while in a second position the first wheel support assembly is moved such that the first wheel moves relatively forwardly of its first position, the sidecar/stroller assembly further including a rear wheel assembly and means for receiving said rear wheel assembly when the first wheel support assembly is in its second position, whereby the sidecar/stroller apparatus functions as a stroller;
   means for receiving a lower connecting member extending between the sidecar/stroller assembly and a bicycle in the vicinity of the axles of the first wheel and the wheels of the bicycle; and
   means for receiving an upper connecting member extending between the sidecar/stroller assembly and the bicycle a distance above the lower connecting member.

2. An apparatus of claim 1, including upper and lower connecting member which are attachable to and removable from the bicycle and the sidecar/stroller.

3. An apparatus of claim 1, wherein the first wheel support assembly includes two elongated elements, one end of both of said elements supporting the first wheel and the other end of both of said elements being pivotally connected to mounting points on the sidecar/stroller assembly.

4. An apparatus of claim 1, including a bumper element extending between the wheel support assembly and a lower part of a remaining portion of the sidecar/stroller assembly, thereby providing a shock-absorbing capability for the apparatus.

5. An apparatus of claim 4, wherein the bumper element is rotatable on the wheel support assembly, so that it can provide a shock-absorbing capability when the wheel support assembly is in either the first or second positions.

6. An apparatus of claim 1, including two shock-absorbing bumper elements, one bumper element comprising two spaced bumpers connected to and extending downwardly from a lower part of a remaining portion of the sidecar/stroller assembly against the wheel support assembly when the wheel support assembly is in its first position, and the other bumper element comprising a single bumper connected to and extending upwardly from the wheel support assembly against the lower part of the remaining portion of the sidecar/stroller assembly when the wheel support assembly is in its second position.

7. An apparatus of claim 6, including means for varying the position of said one bumper element.

8. An apparatus of claim 1, wherein the sidecar/stroller assembly includes a first bracket for receiving the lower connecting means and the rear wheel assembly, and a second bracket spaced laterally from the first bracket for receiving the rear wheel assembly, which includes two spaced wheels.

9. An apparatus of claim 1, wherein the rear wheels assembly includes two spaced wheel separated by a leaf spring member.

10. An apparatus of claim 1, wherein the sidecar/stroller assembly includes a first, generally oval-shaped, generally horizontally oriented, frame portion, a second frame portion which extends first downwardly from a rear end of the first frame portion, then forwardly and then upwardly, connecting with a front end of the first frame portion, wherein the wheel support assembly is pivotally connected to the second frame portion, a third, hoop-like frame portion which extends at an angle between the first and second frame portions to a point above the first frame portion, a seat assembly supported by the second frame portion for a passenger, and a fourth frame portion connected to the upper end of the third frame portion and the rear end of the first frame portion, extending above and to the rear of the first, second and third frame portions.

11. An apparatus of claim 1, including handlebars positioned at a rear end of the apparatus, the handlebars being movable between two positions, wherein in a first position the handlebars are in a vertical orientation and in a second position the handlebars are in a horizontal orientation, to receive the hands of a user when the apparatus is in its stroller configuration.

12. An apparatus of claim 1, wherein portions of the sidecar/stroller assembly are removable from a remainder thereof, permitting convenient storage and transportation of the apparatus.

* * * * *